(12) United States Patent
Wu

(10) Patent No.: US 9,365,190 B2
(45) Date of Patent: Jun. 14, 2016

(54) CONNECTING DEVICE OF WINDSHIELD WIPER

(71) Applicant: Shengzhu Wu, Xiamen (CN)

(72) Inventor: Shengzhu Wu, Xiamen (CN)

(73) Assignee: XIAMEN METO AUTO PARTS INDUSTRY CO., LTD., Xiamen, Fujian (CN)

( * ) Notice: Subject to any disclaimer, the term of this patent is extended or adjusted under 35 U.S.C. 154(b) by 411 days.

(21) Appl. No.: 14/043,527

(22) Filed: Oct. 1, 2013

(65) Prior Publication Data

US 2015/0089764 A1    Apr. 2, 2015

(51) Int. Cl.
*B60S 1/40* (2006.01)

(52) U.S. Cl.
CPC ............... *B60S 1/4003* (2013.01); *B60S 1/407* (2013.01); *B60S 2001/4032* (2013.01); *B60S 2001/4035* (2013.01); *B60S 2001/4051* (2013.01); *B60S 2001/4054* (2013.01); *B60S 2001/4058* (2013.01); *B60S 2001/4061* (2013.01)

(58) Field of Classification Search
CPC .... B60S 1/4003; B60S 1/4067; B60S 1/4077; B60S 1/407; B60S 1/4074; B60S 2001/408
See application file for complete search history.

(56) References Cited

U.S. PATENT DOCUMENTS

2012/0279008 A1* 11/2012 Depondt ................. B60S 1/387
                                                          15/250.32

* cited by examiner

*Primary Examiner* — Monica Carter
*Assistant Examiner* — Andrew A Horton

(57) ABSTRACT

The present invention discloses a connecting device of a windshield wiper. The connecting device includes a connector main body. Through the connector main body to cooperate with other parts, a buckle cap, a resilient engaging member, a reverse U-like limit block, or a functional outer cap, the connecting device of the present invention can be applied to connect with nine windshield wiper arms when in use, so it can be used widely.

2 Claims, 19 Drawing Sheets

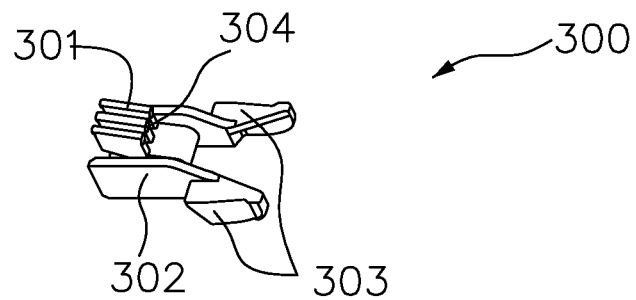
F I G. 3A
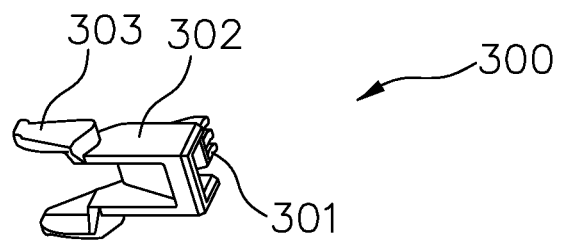
F I G. 3B
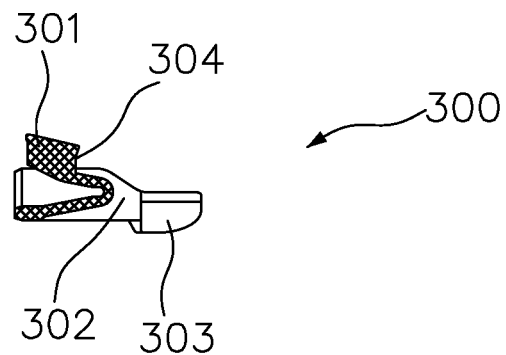
F I G. 3C

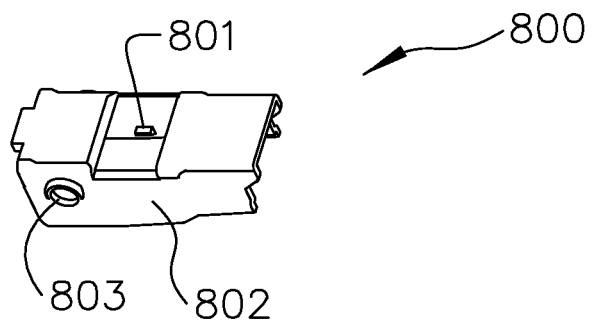
F I G. 5A
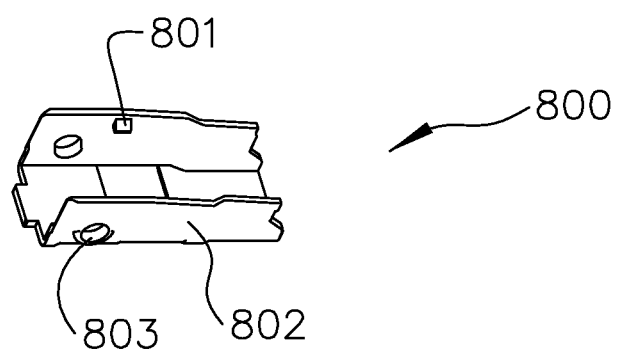
F I G. 5B

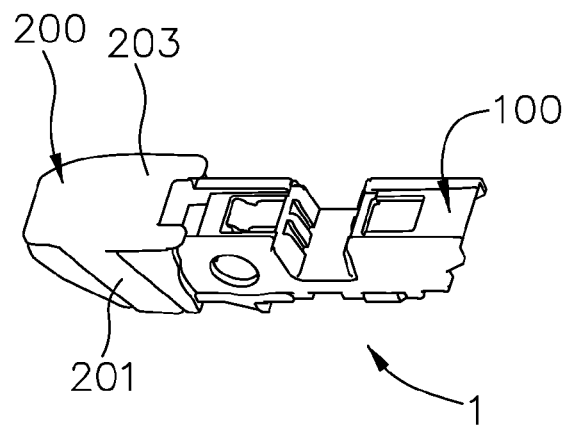
F I G. 6A
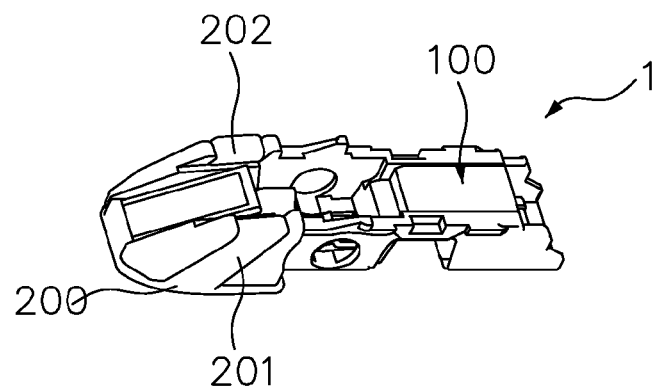
F I G. 6B
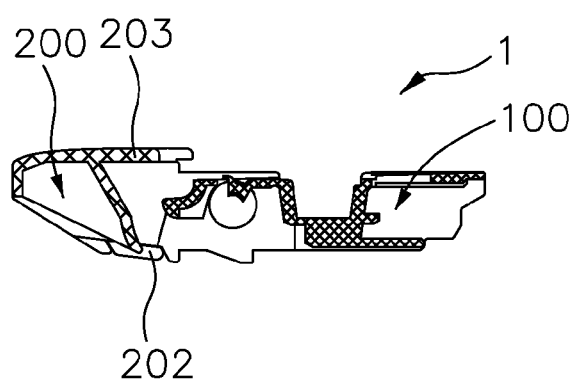
F I G. 6C

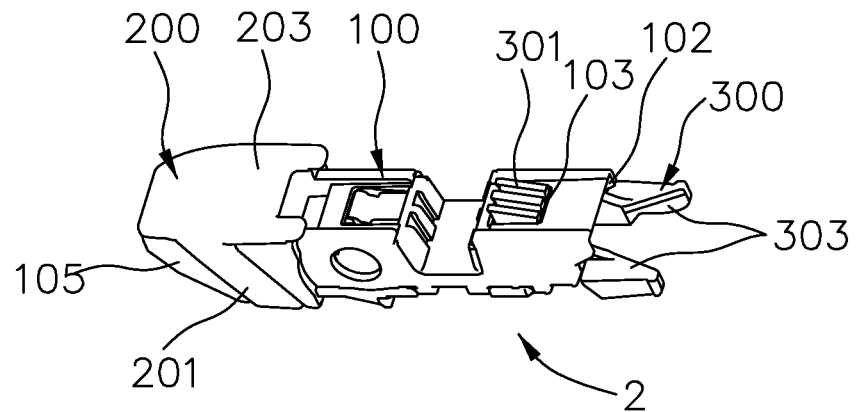
F I G. 7A
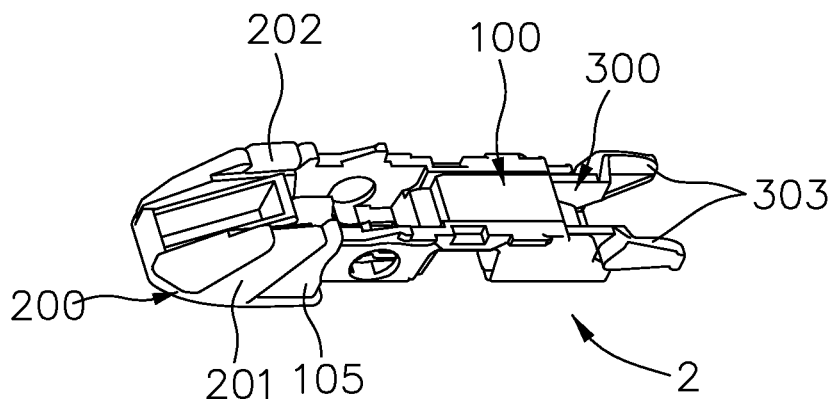
F I G. 7B
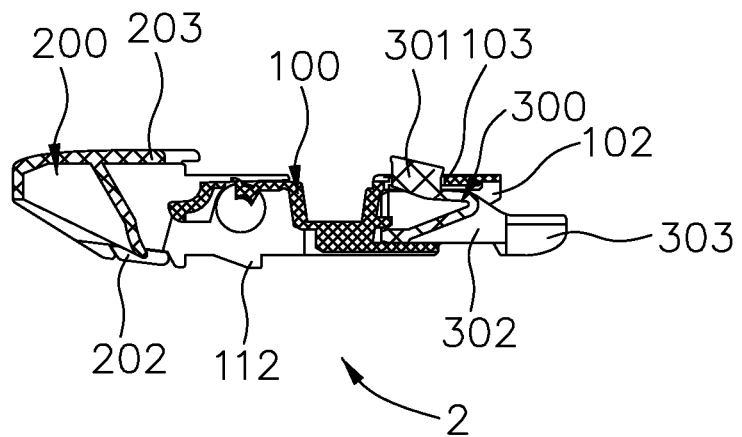
F I G. 7C

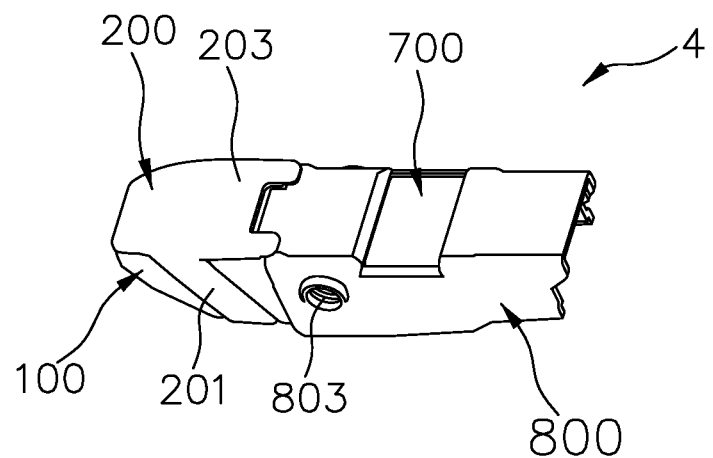
F I G. 9A
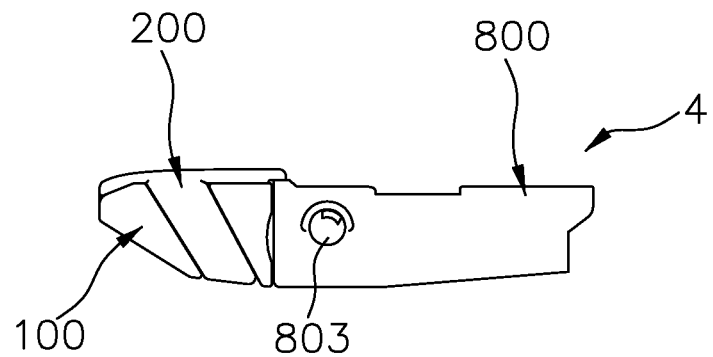
F I G. 9B

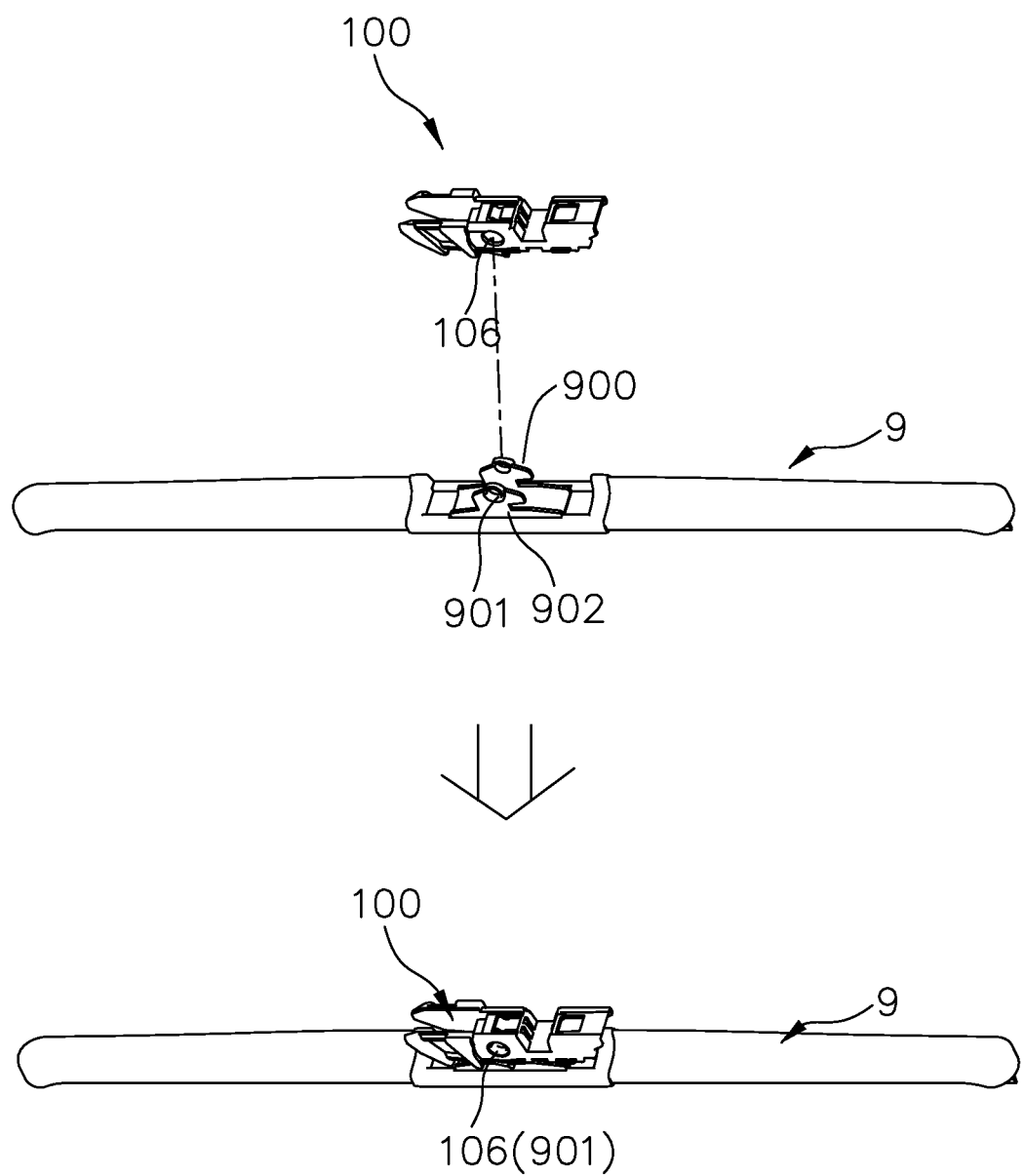
F I G. 10

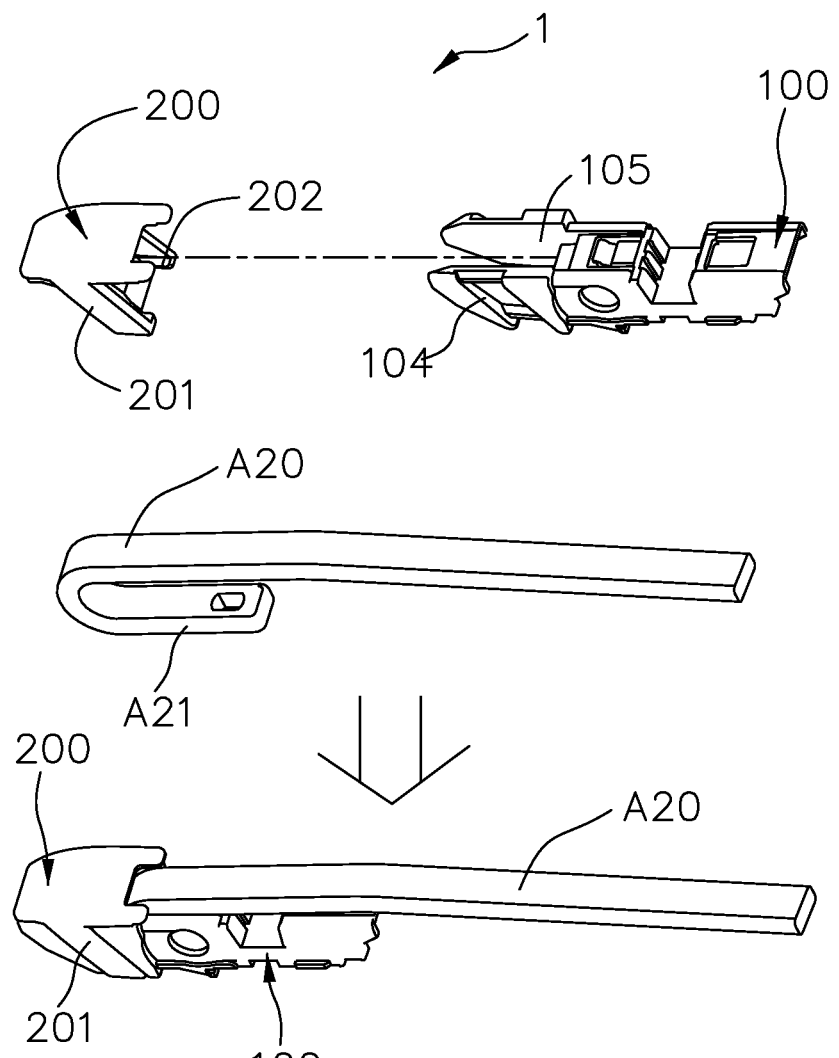
F I G. 12A
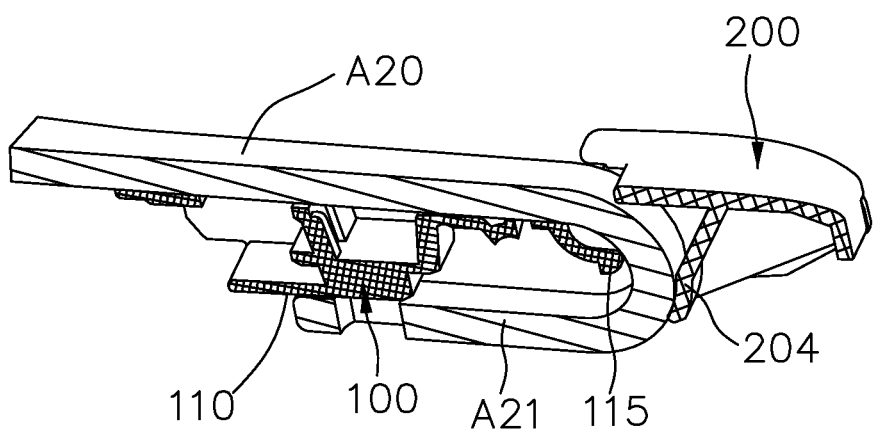
F I G. 12B

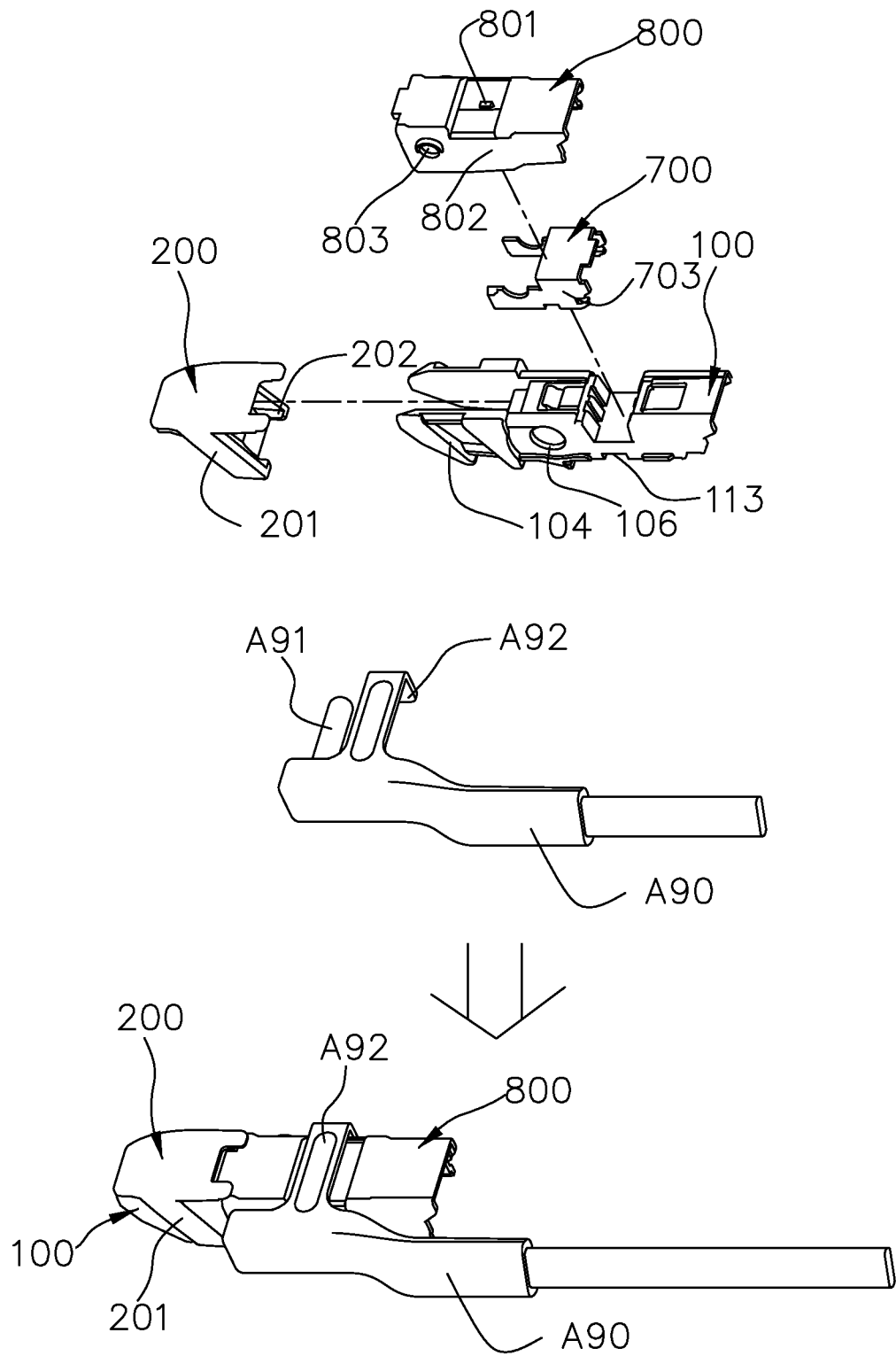
F I G. 19

CONNECTING DEVICE OF WINDSHIELD WIPER

BACKGROUND OF THE INVENTION

1. Field of the Invention

The present invention relates to a windshield wiper, and more particularly to a connecting device of a windshield wiper.

2. Description of the Prior Art

A windshield wiper is used to scrape rainwater or dust on the windshield so as to prevent rainwater from blocking the vision of the driver. The windshield wiper plays a very important role for vehicles.

The windshield wiper is connected to a windshield wiper arm disposed on the outside of the windshield through a connecting device. In general, the structure of the connecting device is designed according to the structure of the windshield wiper arm. However, different brands and vehicle models have different windshield wiper arm structures so the suitability of the windshield wiper is not good. For the above problem, windshield wiper manufacturers have developed many connecting devices for various windshield wiper arms. But, one connecting device is adapted for two or three windshield wiper arms, so it cannot be used widely. Accordingly, the inventor of the present invention has devoted himself based on his many years of practical experiences to solve this problem.

SUMMARY OF THE INVENTION

The primary object of the present invention is to provide a connecting device of a windshield wiper. The connecting device can be applied to various windshield wiper arms and used widely.

According to a first aspect of the present invention, the connecting device comprises a connector main body. The connector main body has side walls at left and right sides thereof. The two side walls have a pair of oblique guide troughs at the front sections thereof and a pair of circular holes at the middle sections thereof. The rear section of the connector main body has a square guide trough with an opening facing rearward and a hole formed on the top wall of the square guide trough.

Preferably, the connecting device further comprises a buckle cap. The buckle cap is installed at the front section of the connector main body. The buckle cap has a top board, a pair of oblique guide rails at two sides of the top board to mate with the pair of oblique guide troughs of the connector main body, and a pair of barbs at the lower ends of the oblique guide rails to buckle the bottom surfaces of the two side walls of the connector main body.

Preferably, a resilient plate is provided on the top of the connector main body and between the two circular holes.

Preferably, the lower part of the connector main body has a vertical stop wall located between the pair of circular holes and the square guide trough. An upper limit plane and a lower limit plane are respectively disposed above and under the stop wall. A holding block is provided between the two side walls. The buckle cap further has a holding block under the top board.

Preferably, the connecting device further comprises a resilient engaging member. The resilient engaging member is installed at the rear section of the connector main body. The resilient engaging member comprises a square guide rail to mate with the square guide trough, a first resilient limit block which is located on the square guide rail and able to swing up and down, and a pair of second resilient limit blocks which are located behind the square guide rail and able to swing left and right.

Preferably, the two side walls of the connector main body have stepped stop surfaces in front of the circular holes so that the two side walls each have a stepped profile.

Preferably, the front portions of the two second resilient limit blocks of the resilient engaging member are vertical stop surfaces or inclined stop surfaces which are inclined downward and rearward.

Preferably, the two side walls of the connector main body, behind the stepped surfaces, further have a stop block extending downward and a pair of side flanges protruding outward.

Preferably, the buckle cap further has two protrusions extending from a rear end of the top board.

According to a second aspect of the present invention, the connecting device comprises a connector main body. The connector main body has side walls at left and right sides thereof. The two side walls have a pair of oblique guide troughs at the front sections thereof and a pair of circular holes at the middle sections thereof. The rear section of the connector main body has a square guide trough with an opening facing rearward and a hole formed on the top wall of the square guide trough. Preferably, the connecting device further comprises a resilient engaging member. The resilient engaging member is installed at the rear section of the connector main body. The resilient engaging member comprises a square guide rail to mate with the square guide trough, a first resilient limit block which is located on the square guide rail and able to swing up and down, and a pair of second resilient limit blocks which are located behind the square guide rail and able to swing left and right. Preferably, the two side walls of the connector main body have stepped stop surfaces in front of the circular holes so that the two side walls each have a stepped profile. Preferably, the two side walls of the connector main body, behind the stepped surfaces, further have a stop block extending downward and a pair of side flanges protruding outward.

Preferably, the connecting device further comprises a reverse U-like limit block. The reverse U-like limit block is installed at the middle section of the connector main body. The reverse U-like limit block has two side walls and a pair of barbs on the two side walls. The two side walls of the connector main body further have engaging troughs disposed at the lower middle sections thereof to mate with the barbs.

Preferably, the connecting device further comprises a buckle cap. The buckle cap is installed at the front section of the connector main body. The buckle cap has a top board, a pair of oblique guide rails at two sides of the top board to mate with the pair of oblique guide troughs of the connector main body, and a pair of barbs at the lower ends of the oblique guide rails to buckle the bottom surfaces of the two side walls of the connector main body.

According to a third aspect of the present invention, the connecting device comprises a connector main body reverse, a U-like limit block, and a functional outer cap. The connector main body has side walls at left and right sides thereof. The two side walls have a pair of oblique guide troughs at the front sections thereof and a pair of circular holes at the middle sections thereof. The two side walls of the connector main body have stepped stop surfaces in front of the circular holes so that the two side walls each have a stepped profile. The two side walls of the connector main body, behind the stepped surfaces, further have a stop block extending downward and a pair of side flanges protruding outward. The rear section of the connector main body has a square guide trough with an opening facing rearward and a hole formed on the top wall of the square guide trough. The reverse U-like limit block is installed at the middle section of the connector main body. The reverse U-like limit block has two side walls. Barbs and engaging troughs are provided on the two side walls. The two side walls of the connector main body further have engaging troughs disposed at the lower middle sections thereof to mate with the barbs. The functional outer cap is installed at the middle section of the connector main body and located the outer side of the reverse U-like limit block. The functional outer cap has a reverse U-like shape. The functional outer cap comprises two side walls, a pair of barbs corresponding in position to the engaging troughs of the reverse U-like limit block, and a pair of circular holes corresponding to the circular holes of the connector main body.

Preferably, the connecting device further comprises a buckle cap. The buckle cap is installed at the front section of the connector main body. The buckle cap has a top board, a pair of oblique guide rails at two sides of the top board to mate with the pair of oblique guide troughs of the connector main body, and a pair of barbs at the lower ends of the oblique guide rails to buckle the bottom surfaces of the two side walls of the connector main body.

Through the connector main body to cooperate with the other parts, such as the buckle cap, the resilient engaging member, the reverse U-like limit block, or the functional cap, the connecting device of the present invention can be applied to connect with nine windshield wiper arms when in use, so it can be used widely.

BRIEF DESCRIPTION OF THE DRAWINGS

FIG. 3A is a perspective view showing the resilient engaging member of the present invention;

FIG. 3B is another perspective view showing the resilient engaging member of the present invention;

FIG. 3C is a sectional view showing the resilient engaging member of the present invention;

FIG. 5A is a perspective view showing the functional outer cap of the present invention;

FIG. 5B is another perspective view showing the functional outer cap of the present invention;

FIG. 6A is a perspective view showing the first connecting device composed of the connector main body and the buckle cap of the present invention;

FIG. 6B is another perspective view showing the first connecting device composed of the connector main body and the buckle cap of the present invention;

FIG. 6C is a sectional view showing the first connecting device composed of the connector main body and the buckle cap of the present invention;

FIG. 7A is a perspective view showing the second connecting device composed of the connector main body, the buckle cap and the resilient engaging member of the present invention;

FIG. 7B is another perspective view showing the second connecting device composed of the connector main body, the buckle cap and the resilient engaging member of the present invention;

FIG. 7C is a sectional view showing the second connecting device composed of the connector main body, the buckle cap and the resilient engaging member of the present invention;

FIG. 9A is a perspective view showing the fourth connecting device composed of the connector main body, the buckle cap, the reverse U-like limit block and the functional outer cap of the present invention;

FIG. 9B is a side perspective view showing the fourth connecting device composed of the connector main body, the buckle cap, the reverse U-like limit block and the functional outer cap of the present invention;

FIG. 10 is a schematic view showing the assembly process of the connector main body of the present invention and the windshield wiper;

FIG. 12A is a schematic view showing the assembly process of the first connecting device of the present invention and the windshield wiper A20;

FIG. 12B is a sectional view showing the first connecting device of the present invention and the windshield wiper A20 after assembled;

FIG. 19 is a schematic view showing the assembly process of the third connecting device of the present invention and the windshield wiper A90.

DETAILED DESCRIPTION OF THE PREFERRED EMBODIMENTS

Figure 1A:
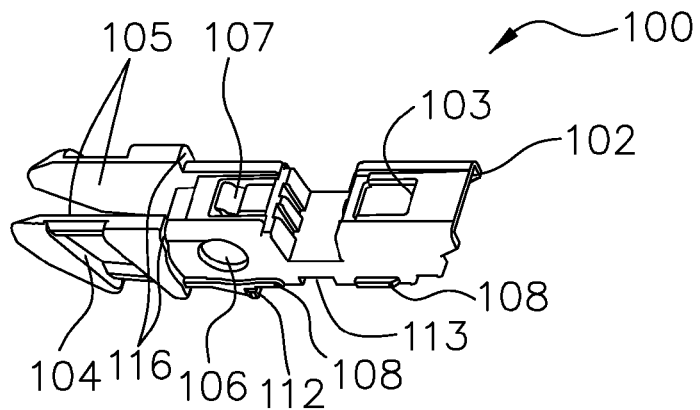
FIG. 1A is a perspective view showing the connector main body of the present invention.

Embodiments of the present invention will now be described, by way of example only, with reference to the accompanying drawings.

Referring to FIGS. 1A-1C, FIGS. 2A-2D, FIGS. 3A-3C, FIGS. 4A-4B, FIGS. 5A-5B, the present invention discloses a connecting device of a windshield wiper. The present invention comprises a connector main body 100. The connector main body 100 may cooperate with a buckle cap 200, a resilient engaging member 300, a reverse U-like limit block 700, or a functional outer cap 800 or a combination thereof so as to connect the windshield wiper main body with various windshield wiper arms.

Figure 1B:
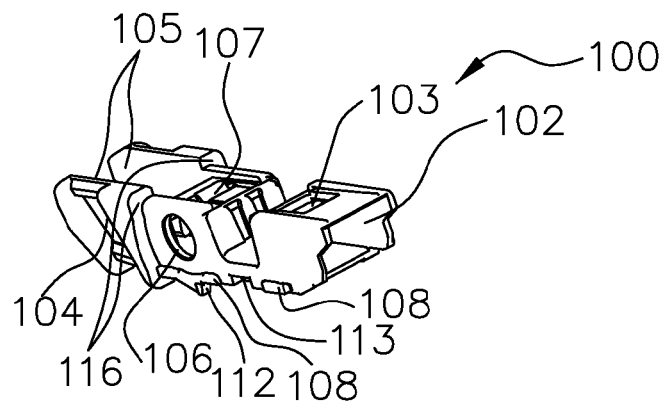
FIG. 1B is another perspective view showing the connector main body of the present invention.
Figure 1C:
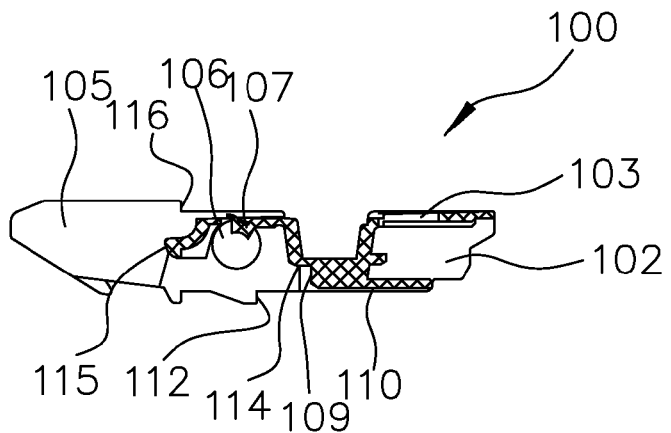
FIG. 1C is a sectional view showing the connector main body of the present invention.
Figure 2A:
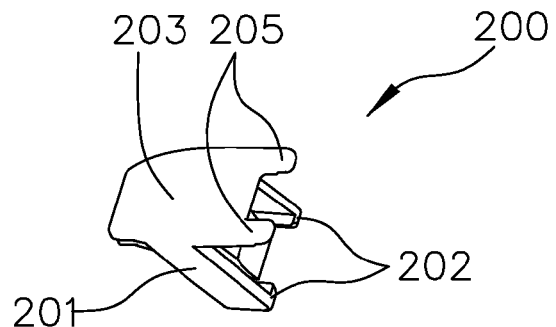
FIG. 2A is a perspective view showing the buckle cap of the present invention.
Figure 2B:
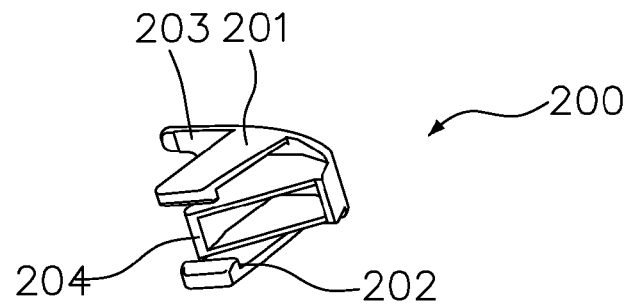
FIG. 2B is another perspective view showing the buckle cap of the present invention.
Figure 2C:
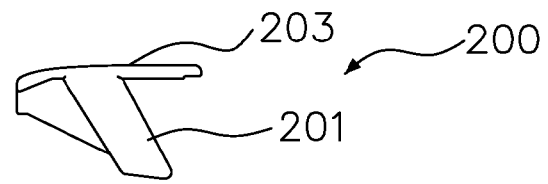
FIG. 2C is a side view showing the buckle cap of the present invention.
Figure 2D:
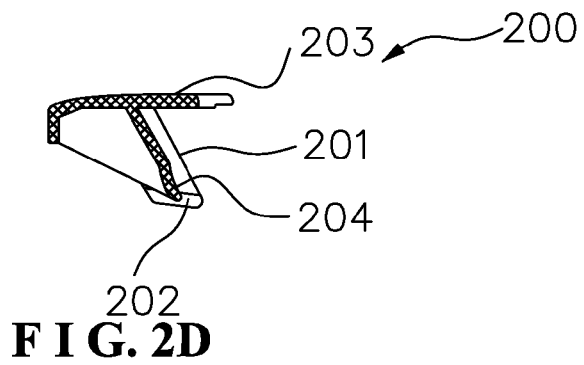
FIG. 2D is a sectional view showing the buckle cap of the present invention.

As shown in FIG. 1A to FIG. 1C, the connector main body 100 has side walls 105 at left and right sides thereof. The two side walls 105 have a pair of oblique guide troughs 104 at the front sections thereof, a pair of circular holes 106 at the middle sections thereof, and a pair of stepped stop surfaces 116 in front of the circular holes 106 so that the two side walls 105 each have a stepped profile. The two side walls 105 further have a stop block 112 extending downward, a pair of side flanges 108 protruding outward, and engaging troughs 113 which are located behind the stepped surfaces 116. A resilient plate 107 is provided on the top of the connector main body 100 and between the two circular holes 106. A holding block 115 is provided between the two side walls 105. The rear section of the connector main body 100 has a square guide trough 102 with an opening facing rearward and a hole 103 formed on the top wall of the square guide trough 102. The lower part of the connector main body 100 has a vertical stop wall 109 located between the pair of circular holes 106 and the square guide trough 102, and an upper limit plane 114 and a lower limit plane 110 respectively disposed above and under the stop wall 109.

As shown in FIG. 2A to FIG. 2D, the buckle cap 200 is installed at the front section of the connector main body 100. The buckle cap 200 has a top board 203, two protrusions 205 extending from the rear end of the top board 203, a pair of oblique guide rails 201 at two sides of the top board 203 to mate with the pair of oblique guide troughs 104 of the connector main body 100, and a pair of barbs 202 at the lower ends of the oblique guide rails 201. The buckle cap 200 further has a holding block 204 under the top board 203. The holding block 204 may be inclined.

As shown in FIG. 3A to FIG. 3C, the resilient engaging member 300 is installed at the rear section of the connector main body 100. The resilient engaging member 300 comprises a square guide rail 302 to mate with the square guide trough 102 of the connector main body 100, a first resilient limit block 301 which is located on the square guide rail 302 and able to swing up and down, and a pair of second resilient limit blocks 303 which are located behind the square guide rail 302 and able to swing left and right. The rear surface of the first resilient limit block 301 is a non-slip oblique surface 304. The front portions of the two second resilient limit blocks 303 may be vertical stop surfaces or inclined stop surfaces which are inclined downward and rearward as shown in the drawings.

Figure 4A:
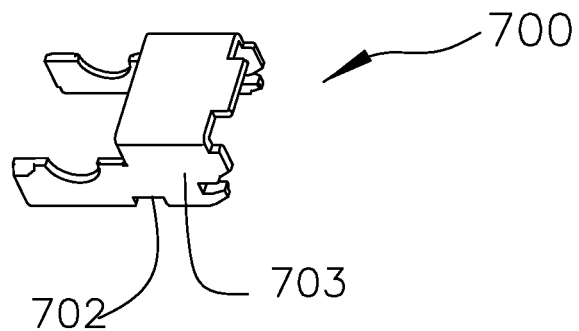
FIG. 4A is a perspective view showing the reverse U-like limit block of the present invention.
Figure 4B:
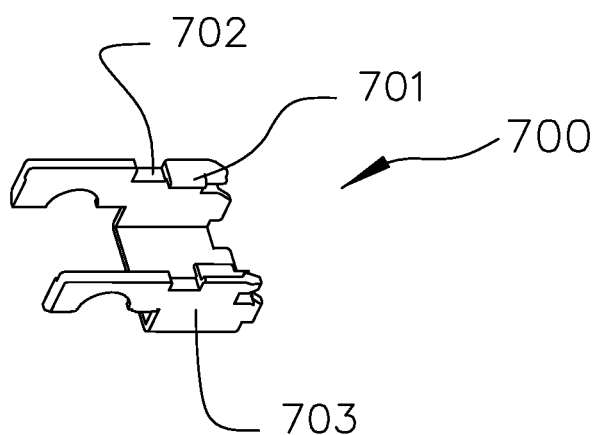
FIG. 4B is another perspective view showing the reverse U-like limit block of the present invention.

As shown in FIG. 4A and FIG. 4B, the reverse U-like limit block 700 is installed at the middle section of the connector main body 100. The reverse U-like limit block 700 has two side walls 703, a pair of barbs 701, and a pair of engaging troughs 702.

As shown in FIG. 5A and FIG. 5B, the functional outer cap 800 is installed at the middle section of the connector main body 100 and located the outer side of the reverse U-like limit block 700. The functional outer cap 800 also has a reverse U-like shape. The functional outer cap 800 comprises two side walls 802, a pair of barbs 801 corresponding in position to the engaging troughs 702 of the reverse U-like limit block 700, and a pair of circular holes 803 corresponding to the circular holes 106 of the connector main body 100.

The connector main body 100 can be a separate connecting device to connect with a windshield wiper arm or cooperate with one or more of the other parts to form a connecting device in different structure for connecting with different windshield wiper arms.

As shown in FIG. 6A to FIG. 6C, the connector main body 100 and the buckle cap 200 are assembled to constitute a first connecting device 1. The process to assemble the first connecting device 1 is described hereinafter. The two oblique guide rails 201 of the buckle cap 200 are pressed downward along the oblique guide troughs 104 of the connector main body 100 until the barbs 202 are buckled to the bottoms of the two side walls 105 of the connector main body 100, such that the buckle cap 200 is installed at the front section of the connector main body 100.

As shown in FIG. 7A to FIG. 7C, the connector main body 100, the buckle cap 200, and the resilient engaging member 300 are assembled to constitute a second connecting device 2. The process to assemble the second connecting device 2 is described hereinafter. The buckle cap 200 is installed at the front section of the connector main body 100, and the assembly is the same as the first connecting device 1. After that, the resilient engaging member 300 is assembled. The first resilient limit block 301 of the resilient engaging member 300 is pressed downward for the square guide rail 302 to be inserted along the square guide trough 102 of the connector main body 100 until the first resilient limit block 301 is restored and buckled in the hole 103 of the connector main body 100, such that the resilient engaging member 300 is installed at the rear section of the connector main body 100.

Figure 8A:
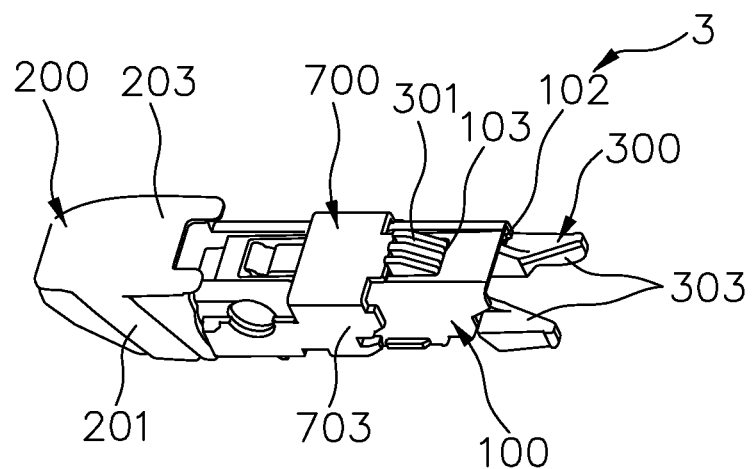
FIG. 8A is a perspective view showing the third connecting device composed of the connector main body, the buckle cap, the resilient engaging member and the reverse U-like limit block of the present invention.
Figure 8B:
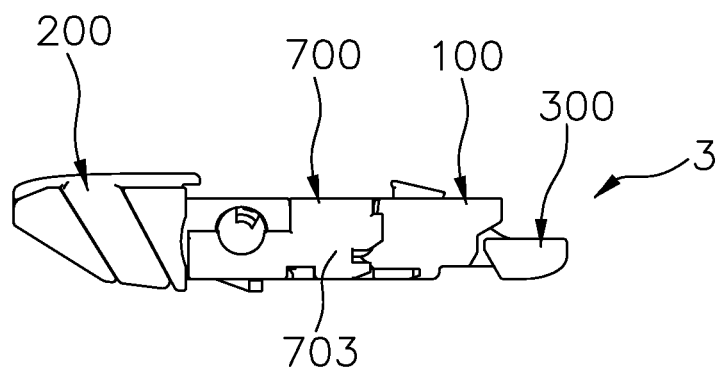
FIG. 8B is a side view showing the third connecting device composed of the connector main body, the buckle cap, the resilient engaging member and the reverse U-like limit block of the present invention.

As shown in FIG. 8A to FIG. 8B, the connector main body 100, the buckle cap 200, the resilient engaging member 300, and the reverse U-like limit block 700 are assembled to constitute a third connecting device 3. The process to assemble the third connecting device 3 is described hereinafter. The buckle cap 200 is installed at the front section of the connector main body 100, and the assembly is the same as the first connecting device 1. The resilient engaging member 300 is installed at the rear section of the connector main body 100, and the assembly is the same as the second connecting device 2. After that, the reverse U-like limit block 700 is assembled. The barbs 701 of the two side walls 703 of the reverse U-like limit block 700 are slid downward along the two sides of the connector main body 100 and buckled to the engaging troughs 113 of the connector main body 100, such that the reverse U-like limit block 700 is installed at the middle section of the connector main body 100.

As shown in FIG. 9A to FIG. 9B, the connector main body 100, the buckle cap 200, the reverse U-like limit block 700, and the functional outer cap 800 are assembled to constitute a fourth connecting device 4. The process to assemble the fourth connecting device 4 is described hereinafter. The buckle cap 200 is installed at the front section of the connector main body 100, and the assembly is the same as the first connecting device 1. The reverse U-like limit block is installed at the middle section of the connector main body 100, and the assembly is the same as the third connecting device 3. After that, the functional outer cap 800 is assembled. The barbs 801 of the two side walls 802 of the functional outer cap 800 are slid downward along the two side walls 703 of the reverse U-like limit block 700 and buckled to the engaging troughs 702 of the reverse U-like limit block 700, such that the functional outer cap 800 is installed on the reverse U-like limit block 700 and located at the middle section of the connector main body 100.

As shown in FIG. 10, the various connecting devices of the present invention are installed on a base 900 of a windshield wiper main body 9 through the connector main body 100. The base 900 has two protruding lugs 902 thereon. The two protruding lugs 902 have two protruding rings 901. When installed, the two protruding lugs 902 of the base 900 are inserted between the two side walls 105 of the connector main body 100 and the protruding rings 901 are engaged in the circular holes 106, so that the connector main body 100 is installed on the windshield wiper main body 9 for use.

The various connecting devices of the present invention can cooperate with different windshield wiper arms for use, which are described hereinafter.

Figure 11A:
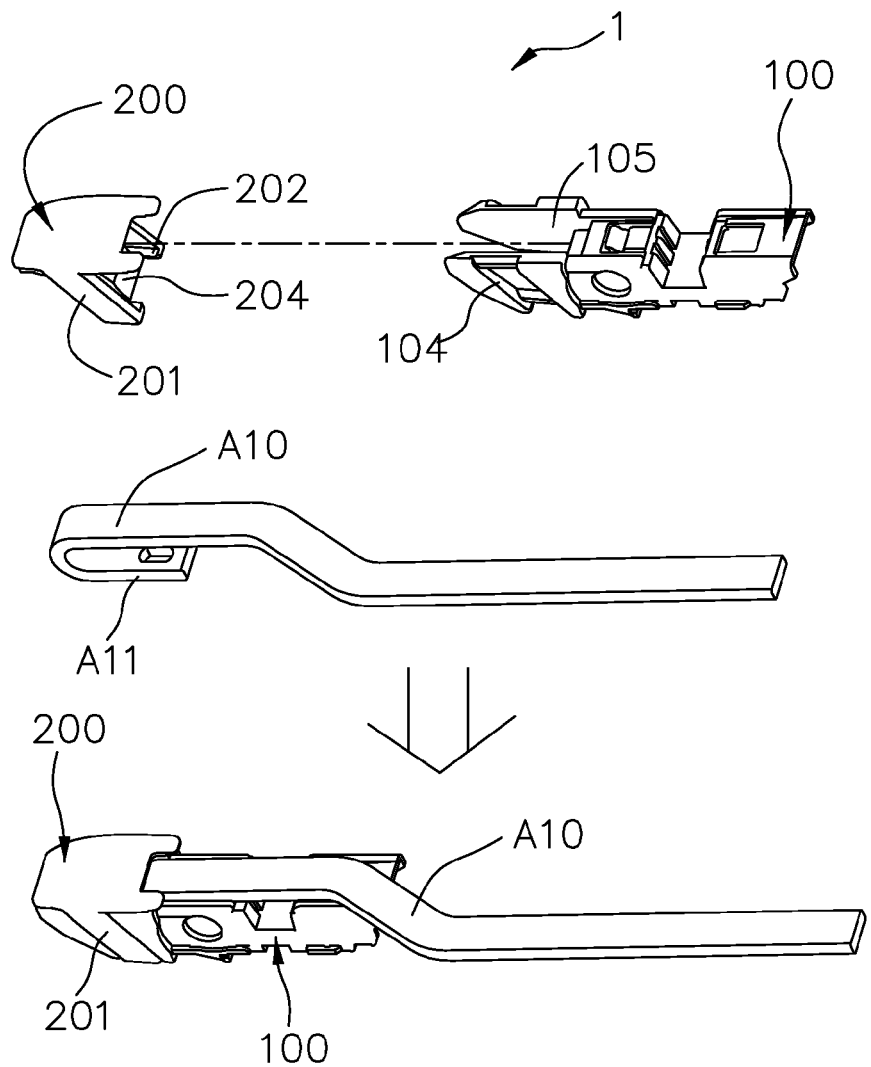
FIG. 11A is a schematic view showing the assembly process of the first connecting device of the present invention and the windshield wiper A10.
Figure 11B:
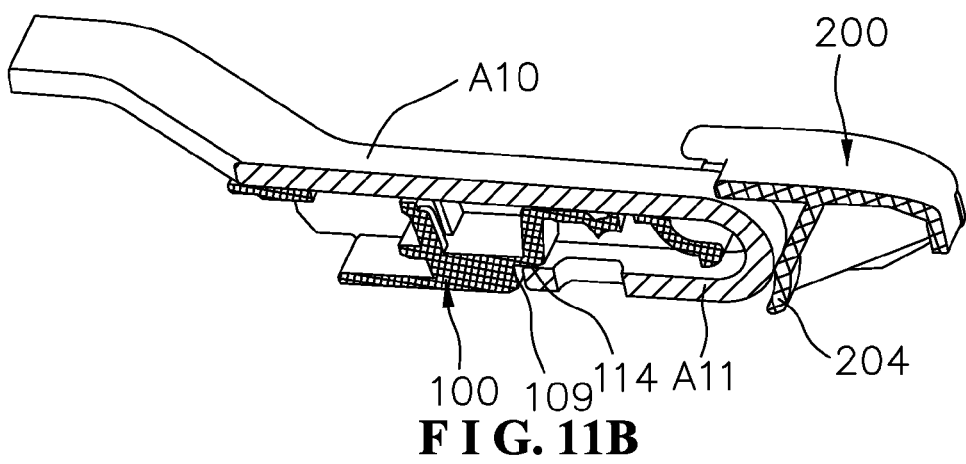
FIG. 11B is a sectional view showing the first connecting device of the present invention and the windshield wiper A10 after assembled.

As shown in FIG. 11A and FIG. 11B, the first connecting device 1 cooperates with an existing windshield wiper arm A10. The windshield wiper arm A10 is in a slat shape, and has a hook A11 at a front end thereof.

When installed, the front end of the windshield wiper arm A10 is placed between the side walls 105 at the front section of the connector main body 100, and then pulled rearward until the hook A11 is buckled to the upper limit plane 114 at the bottom of the connector main body 100 and stopped by the stop wall 109 of the connector main body 100. After that, the buckle cap 200 is installed. The process of installation is as the aforesaid. After installed, the inclined holding block 204 of the buckle cap 200 holds against the windshield wiper arm A10 to limit movement of the windshield wiper arm A10. The installation is completed.

When disassembled, the barbs 202 of the buckle cap 200 are pulled apart with hands to disengage from the windshield wiper arm A10.

As shown in FIG. 12A and FIG. 12B, the first connecting device 1 cooperates with an existing windshield wiper arm A20. The structure of the windshield wiper arm A20 is similar to that of the windshield wiper arm A10. The windshield wiper arm A20 is also in a slat shape, and has a hook A21 at a front end thereof. The hook A21 at the front end of the windshield wiper arm A20 has a larger bent curve.

When installed, the front end of the windshield wiper arm A20 is placed between the side walls 105 at the front section of the connector main body 100 and then pulled rearward until the hook A21 is buckled to the lower limit plane 110 at the bottom of the connector main body 100, and the inner side of the hook A21 of the windshield wiper arm A20 is stopped by the holding block 115 of the connector main body 100. After that, the buckle cap 200 is installed. The process of installation is as the aforesaid. After installed, the inclined holding block 204 of the buckle cap 200 holds against the front end of the windshield wiper arm A20 to limit movement of the windshield wiper arm A20. The installation is completed.

When disassembled, the barbs 202 of the buckle cap 200 are pulled apart with hands to disengage from the windshield wiper arm A20.

Figure 13A:
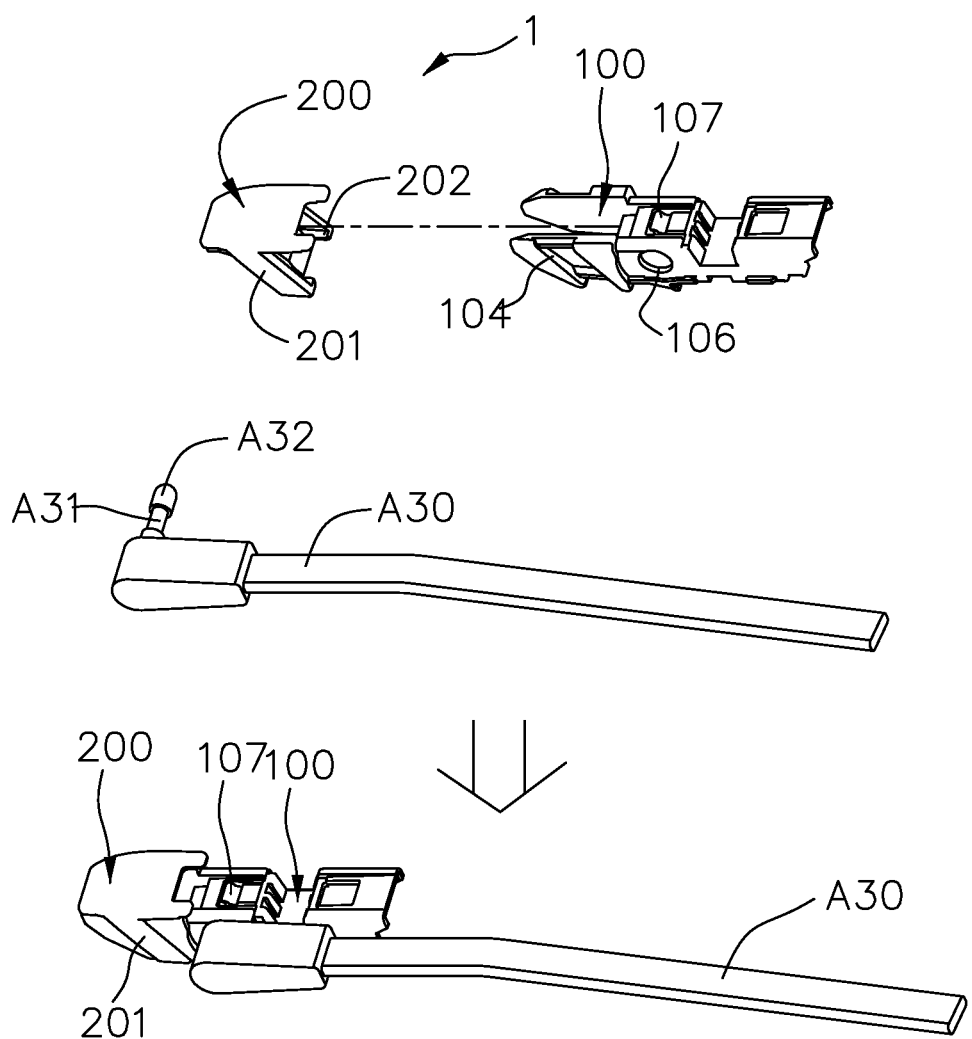
FIG. 13A is a schematic view showing the assembly process of the first connecting device of the present invention and the windshield wiper A30.
Figure 13B:
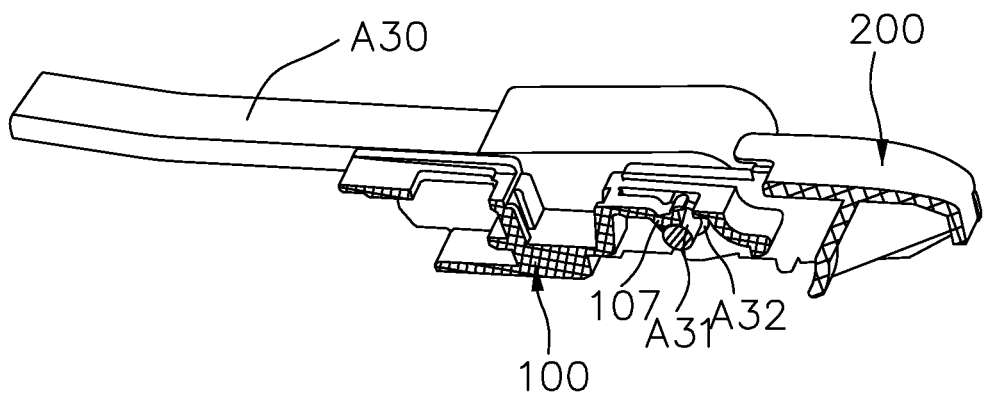
FIG. 13B is a sectional view showing the first connecting device of the present invention and the windshield wiper A30 after assembled.

As shown in FIG. 13A and FIG. 13B, the first connecting device 1 cooperates with an existing windshield wiper arm A30. One side of the front end of the windshield wiper arm A30 has a connecting shaft A32. The connecting shaft A32 has a reduced portion A31 at a middle section thereof.

When installed, the connector main body 100 is installed on the base 900 of the windshield wiper main body 9, and then the buckle cap 200 is installed on the connector main body 100. After that, the connecting shaft A32 of the windshield wiper arm A30 passes through the circular holes 106 of the connector main body 100, and then the resilient plate 107 of the connector main body 100 is buckled on the reduced portion A31 of the connecting shaft A32. The installation is completed.

When disassembled, the resilient plate 107 of the connector main body 100 is pulled apart with hands to disengage from the windshield wiper arm A30.

It is noted that the buckle cap 200 of the present invention only provides a decoration function, without a limit function. Therefore, the windshield wiper arm A30 can use the connecting device composed of the connector main body 100 only for connection.

Figure 14:
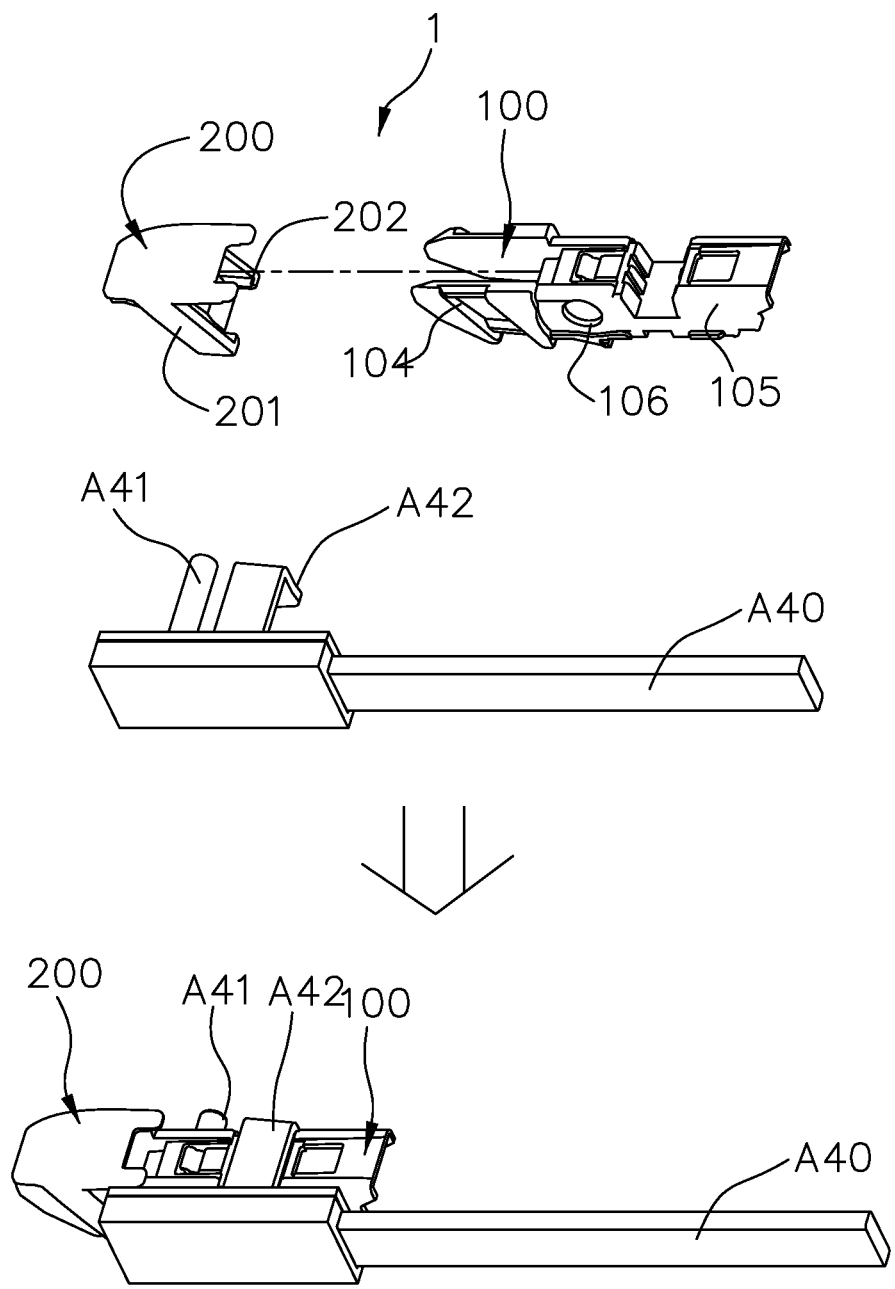
FIG. 14 is a schematic view showing the assembly process of the first connecting device of the present invention and the windshield wiper A40.

As shown in FIG. 14, the first connecting device 1 cooperates with an existing windshield wiper arm A40. One side of the front end of the windshield wiper arm A40 has a connecting shaft A41 and a flat buckle A42.

When installed, the connector main body 100 is installed on the base 900 of the windshield wiper main body 9, and then the buckle cap 200 is installed on the connector main body 100. After that, the connecting shaft A41 of the windshield wiper arm A40 passes through the circular holes 106 from one side of the connector main body 100 and the flat buckle A42 strides over the connector main body 100 to buckle on another side wall 105. The installation is completed.

When disassembled, the windshield wiper arm A40 is turned upward for the flat buckle A42 to disengage from the connector main body 100 so as to draw out the windshield wiper arm A40 from the side.

In this embodiment, the buckle cap 200 only provides a decoration function, without a limit function. Therefore, the windshield wiper arm A40 can use the connecting device composed of the connector main body 100 only for connection.

Figure 15A:
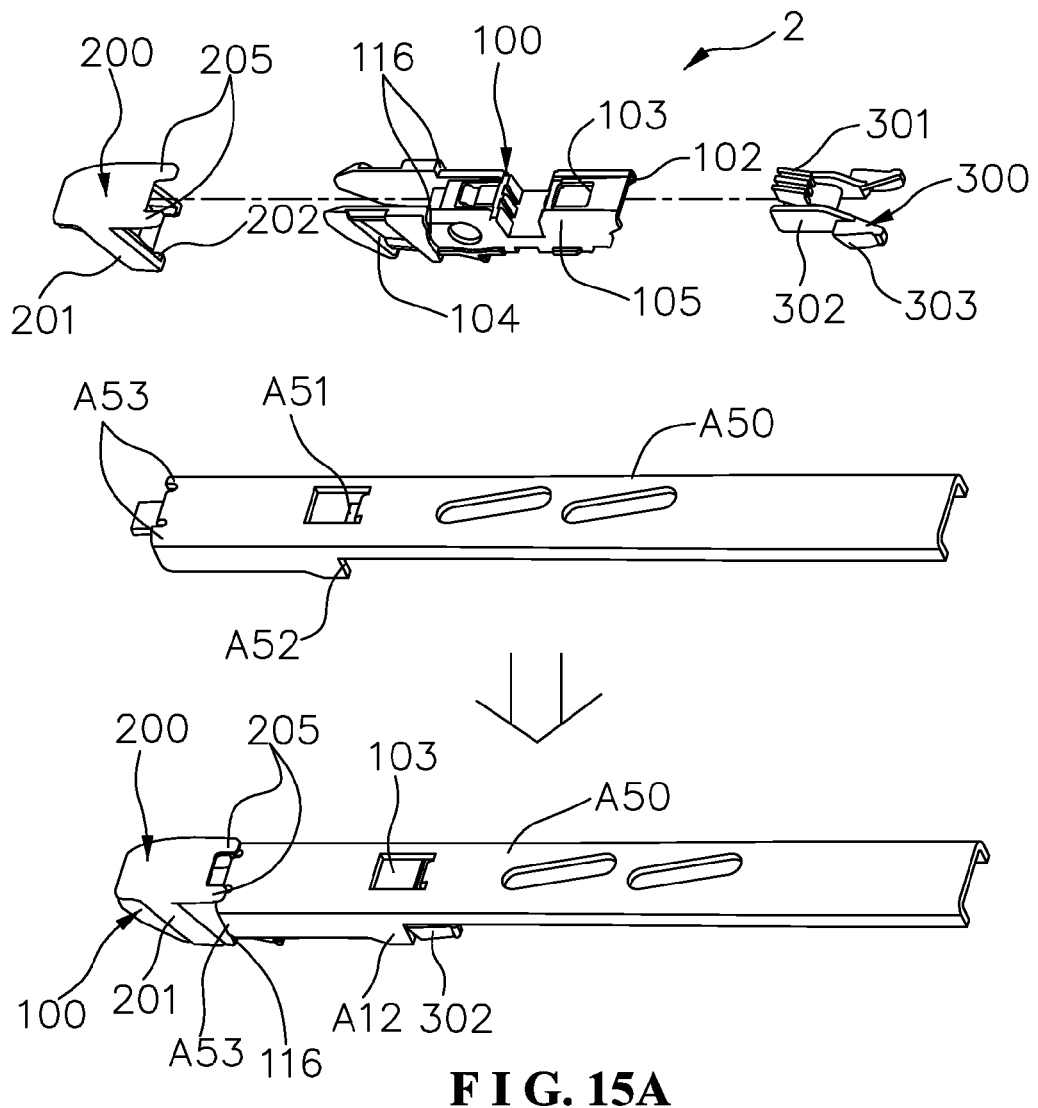
FIG. 15A is a schematic view showing the assembly process of the second connecting device of the present invention and the windshield wiper A50.
Figure 15B:
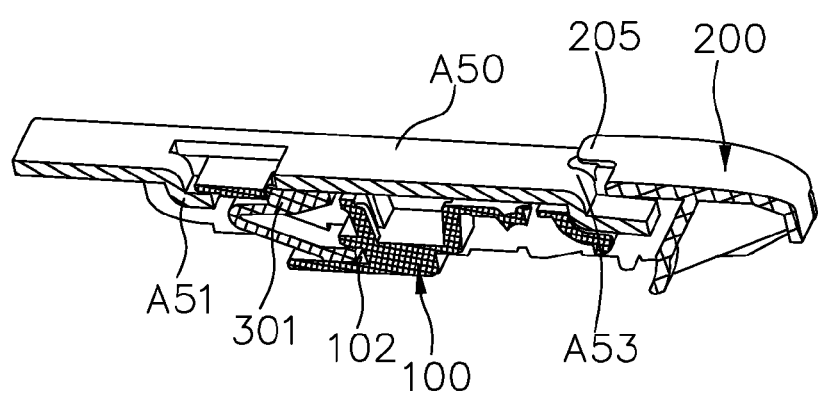
FIG. 15B is a sectional view showing the second connecting device of the present invention and the windshield wiper A50 after assembled.

As shown in FIG. 15A and FIG. 15B, the second connecting device 2 cooperates with an existing windshield wiper arm A50. The cross-section of the windshield wiper arm A50 has a reverse U-like strip shape. The windshield wiper arm A50 has an opening, an engaging block A51 bent downward and forward at the rear side of the opening, and a pair of stop faces A52 at two sides thereof.

When installed, the resilient engaging member 300 is installed at the rear section of the connector main body 100, and then the windshield wiper arm A50 is placed on the connector main body 100. The engaging block A51 is inserted from the square guide rail 102 of the connector main body 100, and the two second resilient limit blocks 303 of the resilient engaging member 300 are compressed inward to give way to the stop faces A52 of the windshield wiper arm A50 until the end face of the front end A53 of the windshield wiper arm A50 is stopped by the stop surface 116 of the connector main body 100 and then the two second resilient limit blocks 303 are released to bounce up. At this time, the two second resilient limit blocks 303 block the stop faces A52 to limit frontward and rearward movement of the windshield wiper arm A50. Finally, the buckle cap 200 is installed as the aforesaid. After installation, the rear end of the top board 203 of the buckle cap 200 or the two protrusions 205 at the rear end of the top board 203 press the front end A53 of the windshield wiper arm A50 to limit up and down movement of the windshield wiper arm A50. During the process, the first resilient limit block 301 of the resilient engaging member 300 is pressed flay by the windshield wiper arm A50 and engaged in the hole 103. The installation is completed. Because the inner size of the reverse U-like configuration of the windshield wiper arm A50 is substantially equal to the outer width between the two side walls 105, the left and right movement of the windshield wiper arm A50 is confined by the two side walls 105 of the connector main body 100. Thus, the windshield wiper arm A50 and the connecting device 3 are connected together.

When disassembled, the barbs 202 of the buckle cap 200 are pulled apart with hands to pull out the buckle cap 200, and the two second resilient limit blocks 303 of the resilient engaging member 300 are compressed inward. In this way, the windshield wiper arm A50 is disassembled.

Figure 16A:
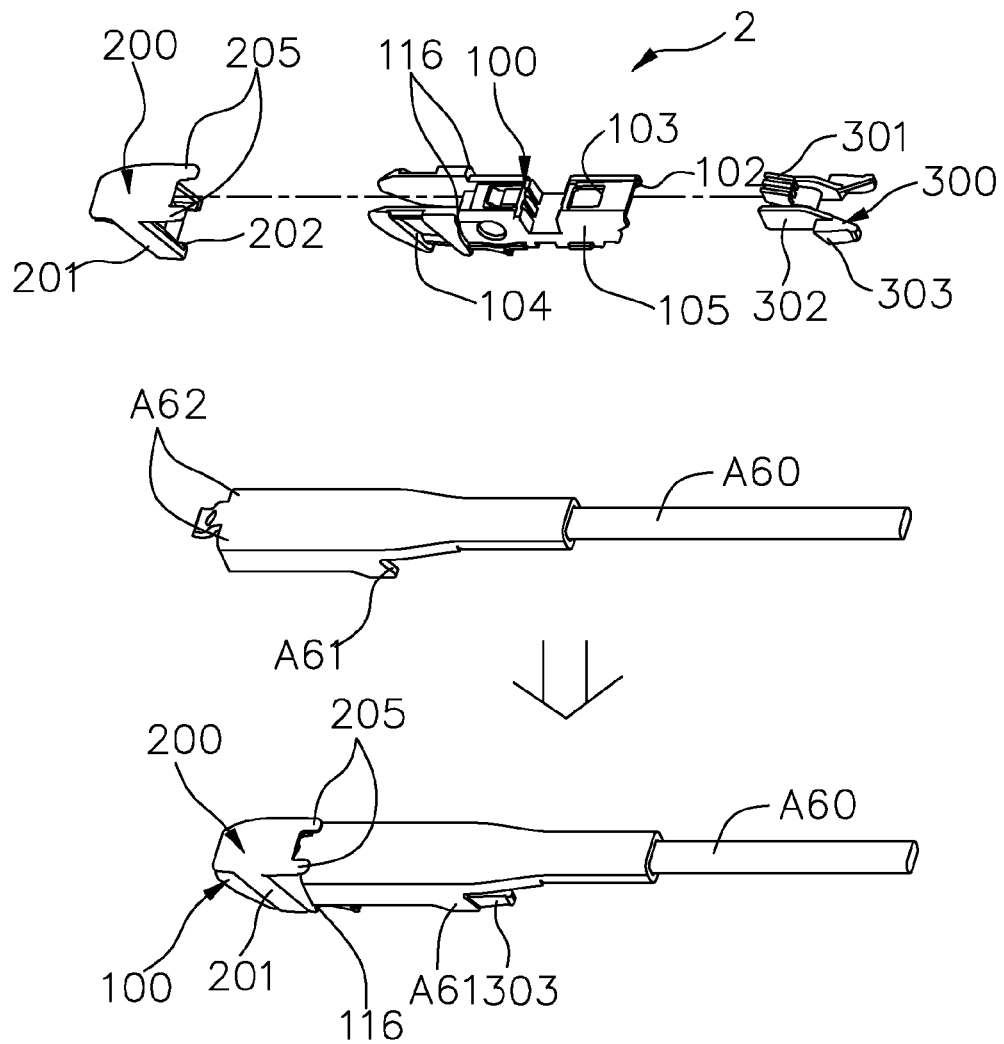
FIG. 16A is a schematic view showing the assembly process of the second connecting device of the present invention and the windshield wiper A60.
Figure 16B:
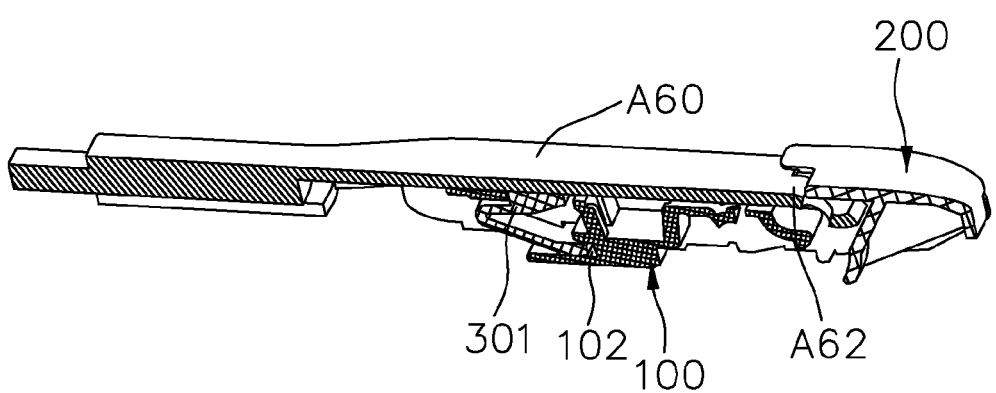
FIG. 16B is a sectional view showing the second connecting device of the present invention and the windshield wiper A60 after assembled.

As shown in FIG. 16A and FIG. 16B, the second connecting device 2 cooperates with an existing windshield wiper arm A60. The cross-section of the front section of the windshield wiper arm A60 has a reverse U-like strip shape. The windshield wiper arm A60 has a pair of stop faces A61 at two sides thereof. The stop faces A61 are inclined barbs.

When installed, the resilient engaging member 300 is installed at the rear section of the connector main body 100, and then the windshield wiper arm A60 is placed on the connector main body 100. The two second resilient limit blocks 303 of the resilient engaging member 300 are compressed inward to give way to the stop faces A61 of the windshield wiper arm A60 until the end face of the front end A62 of the windshield wiper arm A60 is stopped by the stop surface 116 of the connector main body 100 and then the two second resilient limit blocks 303 are released to bounce up. At this time, the two second resilient limit blocks 303 block the stop faces A61. The front portions of the two second resilient limit blocks 303 of the resilient engaging member 300 are inclined stop faces to cooperate with the inclined stop faces A61 so as to limit frontward and rearward as well as up and down movement of the windshield wiper arm A60. At this time, the front end A62 of the windshield wiper arm A60 is not fixed yet so the windshield wiper arm A60 can be turned upward. Finally, the buckle cap 200 is installed. After installation, the rear end of the top board 203 of the buckle cap 200 or the two protrusions 205 at the rear end of the top board 203 press the front end A62 of the windshield wiper arm A60 to limit turning of the windshield wiper arm A60. During the process, the first resilient limit block 301 of the resilient engaging member 300 is pressed flay by the windshield wiper arm A60 and engaged in the hole 103. The installation is completed. Because the inner size of the reverse U-like configuration of the windshield wiper arm A60 is substantially equal to the outer width between the two side walls 105, the left and right movement of the windshield wiper arm A60 is confined by the two side walls 105 of the connector main body 100. Thus, the windshield wiper arm A60 and the connecting device 2 are connected together.

When disassembled, the barbs 202 of the buckle cap 200 are pulled apart with hands to pull out the buckle cap 200, and the two second resilient limit blocks 303 of the resilient engaging member 300 are compressed inward. In this way, the windshield wiper arm A60 is disassembled.

Figure 17A:
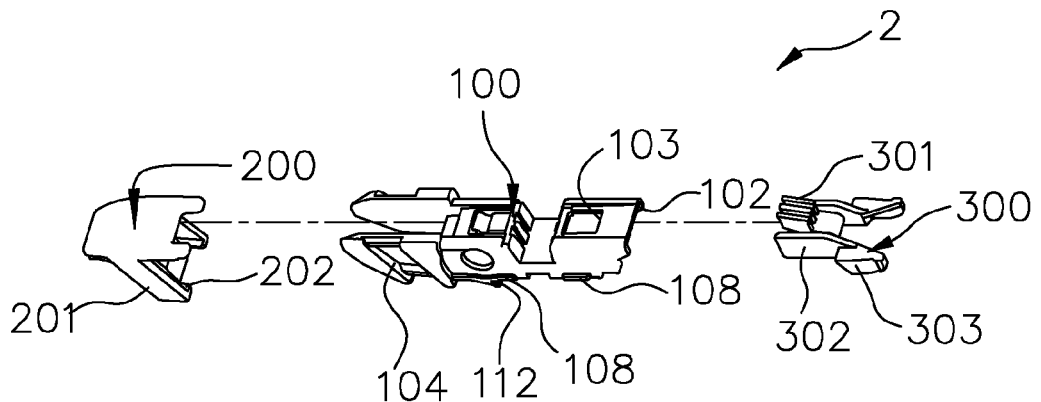
FIG. 17A is a schematic view showing the assembly process of the second connecting device of the present invention and the windshield wiper A70.
Figure 17A:
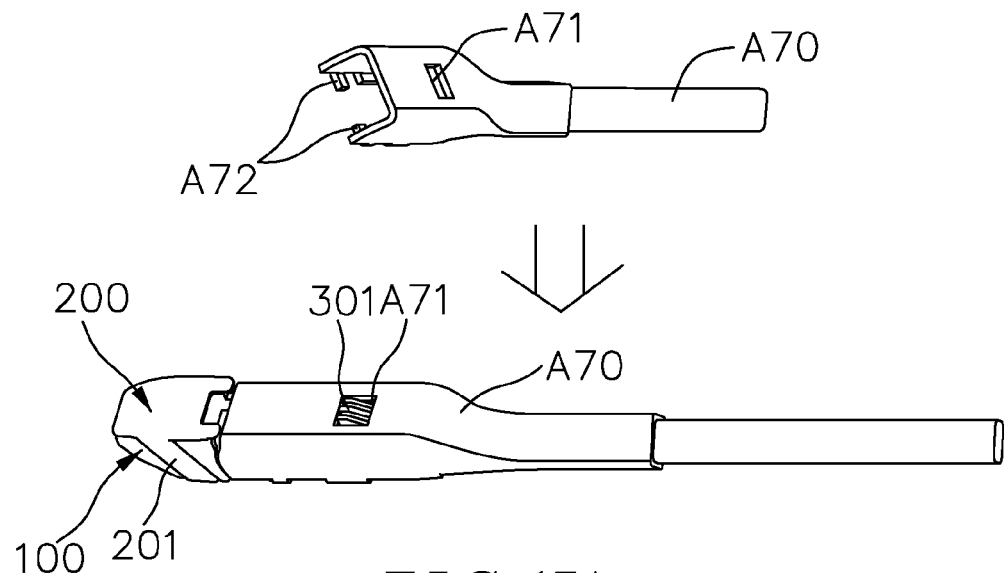
Figure 17B:
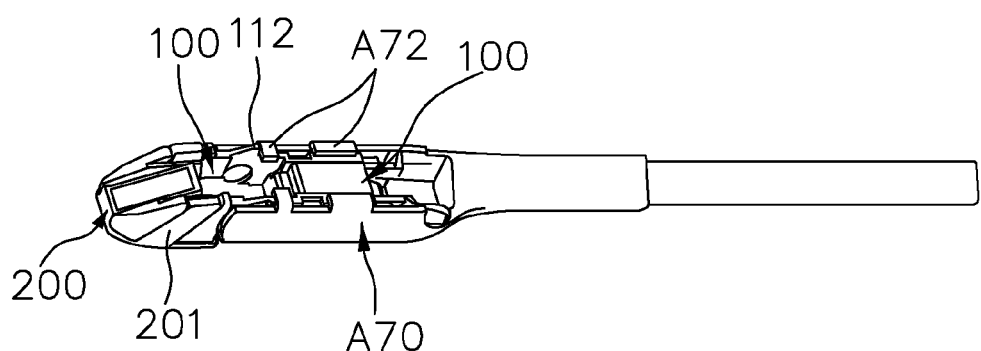
FIG. 17B is a perspective view showing the second connecting device of the present invention and the windshield wiper A70 after assembled.

As shown in FIG. 17A and FIG. 17B, the second connecting device 2 cooperates with an existing windshield wiper arm A70. The cross-section of the front section of the windshield wiper arm A70 has a reverse U-like strip shape. The windshield wiper arm A70 has a through hole A71 thereon and barbs A72 which are disposed inward at the bottoms of two sides thereof.

When installed, the resilient engaging member 300 is installed on the connector main body 100, and then the buckle cap 200 is installed on the connector main body 100. The windshield wiper arm A70 is inserted from the rear of the connecting device 2, and the barbs A72 of the windshield wiper arm A70 hold against the two side walls 105 of the connector main body 100 and the bottoms of the side flanges 108. The two second resilient limit blocks 303 of the resilient engaging member 300 are first compressed inward for the windshield wiper arm A70 to be inserted and then released. When the windshield wiper arm A70 is inserted to approach the first resilient limit block 301, the first resilient limit block 301 is pressed down for the windshield wiper arm A70 to be further inserted to the end until the barbs A72 are stopped by the stop blocks 112 of the connector main body 100 and then the first resilient limit block 301 bounces up to be engaged in the through hole A71 of the windshield wiper arm A70. The installation is completed. Because the inner size of the reverse U-like configuration of the windshield wiper arm A70 is wider than the aforesaid windshield wiper arms A50, A60, the connector main body 100 must be provided with the side flanges 108. The outer width between the two side flanges 108 is substantially equal to the inner size of the reverse U-like configuration of the windshield wiper arm A70, so that the left and right movement of the windshield wiper arm A70 is confined by the two side flanges 108 of the connector main body 100, and the up and down movement of the windshield wiper arm A70 is confined by the top and bottom of the connector main body 100, and the front and rear movement of the windshield wiper arm A70 is confined by the first resilient limit block 301 or the stop blocks 112. Thus, the windshield wiper arm A70 and the connecting device 2 are connected together.

When disassembled, the first resilient limit block 301 is pressed down to disengage from the windshield wiper arm A70.

In this embodiment, the buckle cap 200 only provides a decoration function, without a limit function. Therefore, the windshield wiper arm A70 can use the connecting device composed of the connector main body 100 and the resilient engaging member 300 for connection.

Figure 18A:
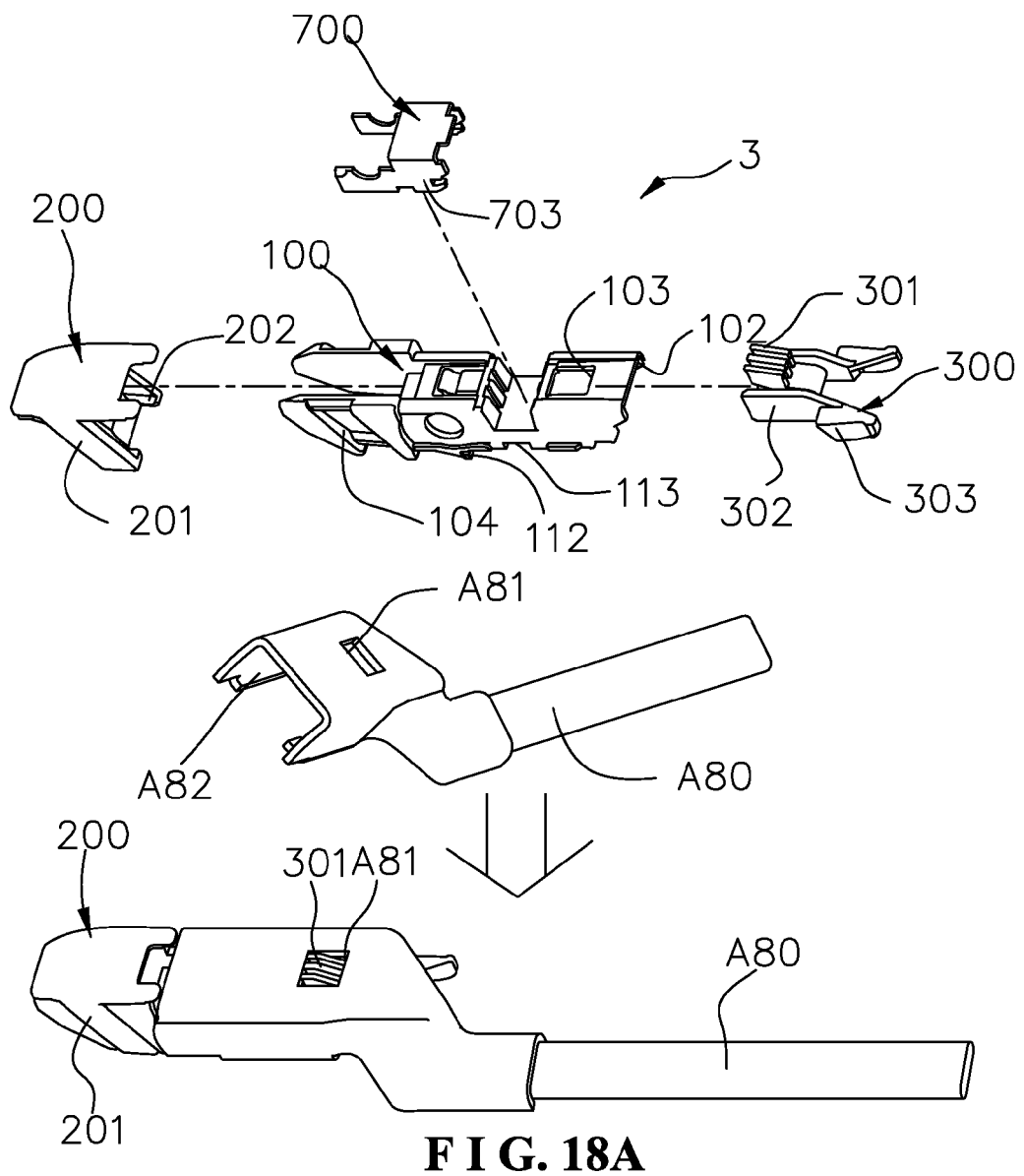
FIG. 18A is a schematic view showing the assembly process of the third connecting device of the present invention and the windshield wiper A80.
Figure 18B:
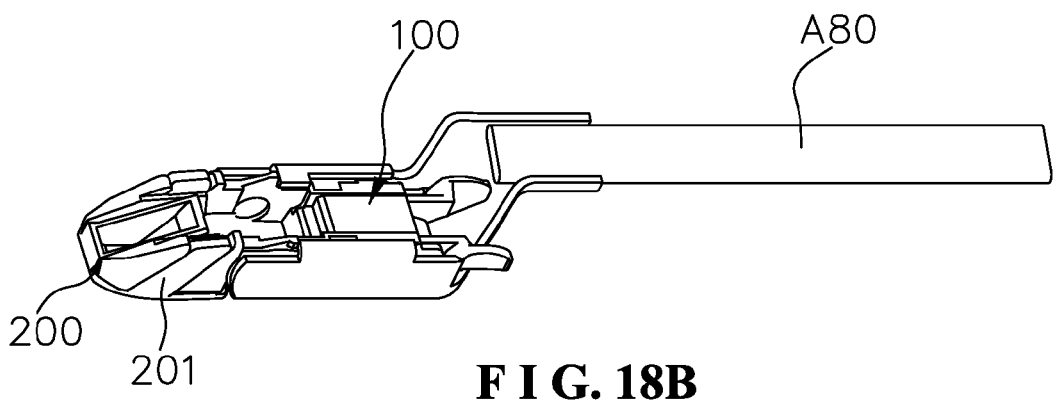
FIG. 18B is a perspective view showing the third connecting device of the present invention and the windshield wiper A80 after assembled.

As shown in FIG. 18A and FIG. 18B, the third connecting device 3 cooperates with an existing windshield wiper arm A80. The cross-section of the front section of the windshield wiper arm A80 has a reverse U-like shape. The front reverse U-like section of the windshield wiper arm A80 has a through hole A81 thereon and barbs A82 which are disposed inward at the bottoms of two sides thereof.

When installed, the third connecting device 3 is first installed, and the assembly way is as the aforesaid. The windshield wiper arm A80 is inserted from the rear of the third connecting device 3, and the barbs A82 of the windshield wiper arm A80 hold against the bottom of the reverse U-like limit block 700. The two second resilient limit blocks 303 of the resilient engaging member 300 are first compressed inward for the windshield wiper arm A80 to be inserted and then released. When the barbs A82 of the windshield wiper arm A80 contact with the stop blocks 112 of the connector main body 100, the first resilient limit block 301 bounces up to be engaged in the through hole A81. The installation is completed. The left and right movement of the windshield wiper arm A80 is confined by the two side walls 703 of the reverse U-like limit block 700, and the up and down movement of the windshield wiper arm A80 is confined by the top and bottom of the connector main body 100, and the front and rear movement of the windshield wiper arm A80 is confined by the first resilient limit block 301 or the stop blocks 112. Thus, the windshield wiper arm A80 and the third connecting device 3 are connected together.

When disassembled, the first resilient limit block 301 is pressed down to disengage from the windshield wiper arm A80.

In this embodiment, the buckle cap 200 only provides a decoration function, without a limit function, namely, the windshield wiper arm A80 can use the connecting device composed of the connector main body 100 and the resilient engaging member 300 for connection.

In addition, the width of the reverse U-like inner trough of the front end of the windshield wiper arm A80 is wider than the width of the reverse U-like inner trough of the front end of the windshield wiper arm A70, so it is necessary to add the reverse U-like limit block 700 to increase the width of the connecting device. The width of the barbs A82 of the windshield wiper arm A80 is narrower, so the barbs A82 are unable to engage with the bottom of the connector main body 100. Therefore, the barbs A82 are engaged at the bottom of the reverse U-like limit block 700.

As shown in FIG. 19, the fourth connecting device 4 cooperates with an existing windshield wiper arm A90. One side of the front end of the windshield wiper arm A90 has a connecting shaft A91 and a flat buckle A92.

When installed, the fourth connecting device 4 is first installed, and the assembly way is as the aforesaid. After that, the connecting shaft A91 of the windshield wiper arm A90 passes through the circular holes 803 of the functional outer cap 800 and the circular holes 106 of the connector main body 100 from one side of the fourth connecting device 4, and the flat buckle A92 strides over the fourth connecting device 4 to buckle on another side wall 802 of the functional outer cap 800. The installation is completed.

When disassembled, the windshield wiper arm A90 is turned upward for the flat buckle A92 to disengage from side wall 802 so as to draw out the windshield wiper arm A90 from the side.

In this embodiment, the buckle cap 200 only provides a decoration function, without a limit function.

In addition, the width of the barbs A92 of the windshield wiper arm A90 relative to main body is wider than the windshield wiper arm A40, so it is necessary to add the reverse U-like limit block 700 and the functional outer cap 800 to increase the width of the fourth connecting device.

It is noted that the aforesaid various windshield wiper arms (from A10 to A90) are the existing windshield wiper arms of different brands or vehicle models. Through the connector main body to cooperate with the other parts, the present invention can be applied to connect with nine windshield wiper arms so it can be used widely.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A connecting device of a windshield wiper, comprising a connector main body, the connector main body having side walls at left and right sides thereof, the two side walls having a pair of oblique guide troughs at front sections thereof and a pair of circular holes at middle sections thereof, a rear section of the connector main body having a square guide trough with an opening facing rearward and a hole formed on a top wall of the square guide trough,
   a resilient engaging member installed at the rear section of the connector main body, the resilient engaging member comprising a square guide rail to mate with the square guide trough, a first resilient limit block which is located on the square guide rail and able to swing up and down, and a pair of second resilient limit blocks which are located behind the square guide rail and able to swing left and right; the two side walls of the connector main body having stepped stop surfaces in front of the circular holes so that the two side walls each have a stepped profile; the two side walls of the connector main body, behind the stepped surfaces, further having a stop block extending downward and a pair of side flanges to protruding outward,
   a reverse U-like limit block installed at a middle section of the connector main body, the reverse U-like limit block having two side walls and a pair of barbs on the two side walls, the two side walls of the connector main body further having engaging troughs disposed at lower middle sections thereof to mate with the barbs, and
   a buckle cap installed at a front section of the connector main body, the buckle cap having a top board, a pair of oblique guide rails at two sides of the top board to mate with the pair of oblique guide troughs of the connector main body, and a pair of barbs at lower ends of the oblique guide rails to buckle bottom surfaces of the two side walls of the connector main body.

2. A connecting device of a windshield wiper, comprising a connector main body, the connector main body having side walls at left and right sides thereof, the two side walls having a pair of oblique guide troughs at front sections thereof and a pair of circular holes at middle sections thereof, a rear section of the connector main body having a square guide trough with an opening facing rearward and a hole formed on a top wall of the square guide trough,
   further comprising a buckle cap installed at a front section of the to connector main body, the buckle cap having a top board, a pair of oblique guide rails at two sides of the top board to mate with the pair of oblique guide troughs of the connector main body, a pair of barbs at lower ends of the oblique guide rails to buckle bottom surfaces of the two side walls of the connector main body, and a reverse U-like limit block and a functional outer cap, the two side walls of the connector main body having stepped stop surfaces in front of the circular holes so that the two side walls each have a stepped profile; the two side walls of the connector main body, behind the stepped surfaces, further having a stop block extending downward and a pair of side flanges protruding outward; the reverse U-like limit block being installed at a middle section of the connector main body, the reverse U-like limit block having two side walls, a pair of barbs and engaging troughs being provided on the two side walls, the two side walls of the connector main body further having engaging troughs disposed at lower middle sections thereof to mate with the barbs; the functional outer cap being installed at the middle section of the connector main body and located an outer side of the reverse U-like limit block, the functional outer cap having a reverse U-like shape, the functional outer cap comprising two side walls, a pair of barbs corresponding in position to the engaging troughs of the reverse U-like limit block, and a pair of circular holes corresponding to the circular holes of the connector main body.

* * * * *